V. DREWSEN.
APPARATUS FOR MAKING BISULFITE LIQUOR, USING PYRITES.
APPLICATION FILED OCT. 11, 1910.
1,119,004.
Patented Dec. 1, 1914.
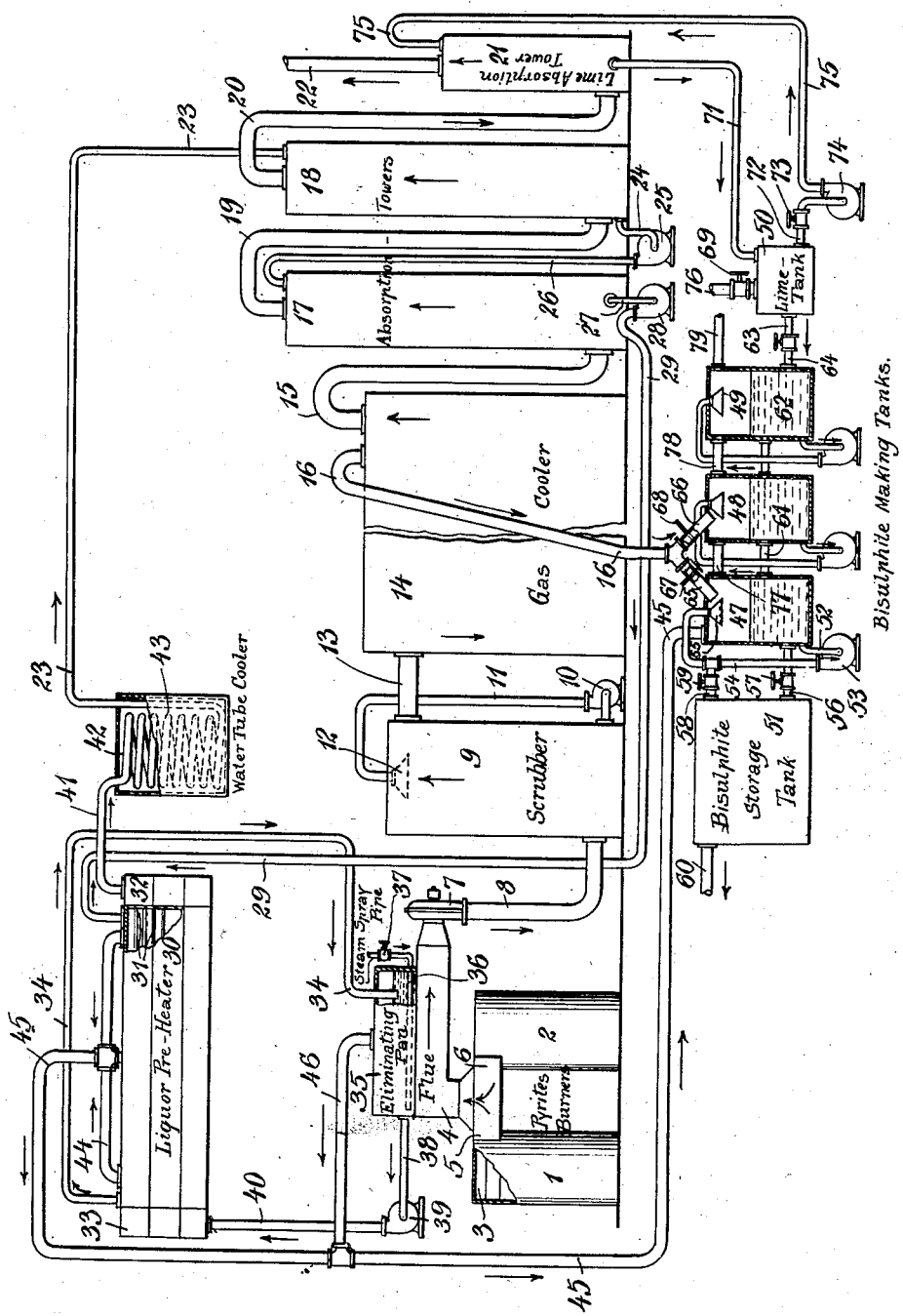
WITNESSES
INVENTOR
Viggo Drewsen
BY
Duncan & Duncan
ATTORNEYS

UNITED STATES PATENT OFFICE.

VIGGO DREWSEN, OF NEW YORK, N. Y.

APPARATUS FOR MAKING BISULFITE LIQUOR, USING PYRITES.

1,119,004. Specification of Letters Patent. Patented Dec. 1, 1914.

Original application filed December 9, 1909, Serial No. 532,237. Divided and this application filed October 11, 1910. Serial No. 586,543.

*To all whom it may concern:*

Be it known that I, VIGGO DREWSEN, a citizen of the United States, and resident of the borough of Brooklyn, county of Kings, city and State of New York, have made certain new and useful Inventions Relating to Apparatus for Making Bisulfite Liquor, Using Pyrites, of which the following is a specification, taken in connection with the accompanying drawing, forming part of the same.

This invention relates to apparatus for utilizing pyrites or other low grade sulfur material for manufacturing bisulfite liquors, such as bisulfite of lime or the like for use in connection with paper making. This may be effected, for example, by passing the sulfurous gases from the burning pyrites through absorption towers after scrubbing and cooling the same and passing the sulfurous liquor produced in said absorption towers through an evaporating pan heated by the freshly formed hot sulfurous gases from the pyrites to drive the concentrated sulfurous gases therefrom. The lime or bisulfite liquor may be passed successively through a series of bisulfite tanks while passing the weak sulfurous gases successively through a number of said tanks in the opposite direction to the flow of liquor therethrough and feeding the concentrated sulfurous gases into the first of said tanks to act upon the bisulfite liquor after absorption of the weaker gases.

The accompanying drawing shows in a diagrammatic way an illustrative embodiment of apparatus adapted for carrying out this invention.

In the illustrative form of apparatus shown in the drawing, one or more suitable burners, such as 1, 2, may be used for burning the pyrites or other sulfurous material, preferably with limited quantities of air so as to produce as concentrated sulfurous gases as possible. The burners may be in the form of McDougal furnaces provided with a plurality of shelves such as 3 and the sulfurous gases discharged from the burner passages 5, 6 may pass through the flue 4 into a suitable centrifugal fan or other blower 7 so as to be discharged through the passage 8 into a scrubber 9 of any desired form. As indicated, the scrubber may be arranged for a continuous circulation of the liquor which may be drawn by the rotary pump or other circulating device 10 from the lower part of the scrubber and forced through the pipe 11 and distributer 12 so as to be showered or sprayed down through the scrubber and remove the particles of impurities from the gases, this continuous circulation obviating waste of the sulfurous gases absorbed in the liquor which rapidly becomes saturated and cannot further absorb the gases. From the scrubber the sulfurous gases may pass through the passage 13 into a suitable gas cooler 14 of any desired construction where the gases may be cooled to the desired extent.

A portion of the sulfurous gases from the cooler which in the case of pyrites contain only about fourteen per cent. or so of sulfur dioxid may be taken in succession through suitable absorption devices, such for instance, as the vertical coke or absorption towers 17, 18. The gases from the cooler 13 may be conducted through the passage 15 into the tower 17 and thence through the passage 19 into the tower 18 from which they may be if desired led through the passage 20 into a final absorption device such as the lime absorption tower 21 for example, where practically all of the remaining sulfur dioxid may be absorbed therefrom for example by contact with the lime or other alkaline liquor used in subsequent stages of the process as said lime liquor or other alkaline liquor passes over the distributing devices in the tower. The result is that the waste gases which are finally discharged from the discharge passage 22 may be made to contain so little sulfur dioxid as to be practically unobjectionable which also economizes loss of available sulfurous material in this way. In order to more effectively eliminate the last portions of the sulfur dioxid the fresh alkali used in forming the bisulfite may be passed through this final absorption tower by arranging a suitable circulation with the lime tank, such as 50. The alkali liquor may be taken from this tank through the pipe 72 in suitable quantities governed by the valve 73 and after passing through the rotary pump or circulating device 74 may be discharged by the pipe 75 into the top of the lime absorption tower 21. The liquor from the bottom of this tower may be led by a suitable pipe, such as 71, back into the alkali tank.

If desired, a continuous circulation of sulfurous liquor may be maintained through the absorption towers and concentrated sulfur dioxid driven therefrom by heat while the weak or exhausted sulfurous liquor, preferably after suitable cooling is returned and passed successively through the towers in the opposite direction to the flow of the sulfurous gases therethrough to become again charged with sulfur dioxid. This may be conveniently effected by passing the water or weak sulfurous liquor through the pipe 23 into the top of the absorption tower 18 and taking the liquor from the bottom of this tower through the pipe 24 leading to the circulating pump 25 which forces it through the pipe 26 into the tower 17. Any desired liquid medium preferably of aqueous character which is capable of absorbing the weak sulfurous gases and allowing the same to be again eliminated therefrom may be used in this bisulfite liquor system and water may be effectively used for this purpose. A suitable pipe, such as 27, may convey the sulfurous liquor from the tower 17 to the pump 28 which may force it through the pipe 29 to suitable devices for heating it and expelling the concentrated sulfurous gases therefrom. These heating devices may comprise a suitable heating or evaporating pan, such as the lead pan, 35, which may be heated by the hot sulfurous gases from the burners, so that a considerable portion of this heat of combustion is utilized in this way and at the same time the desired cooling of the sulfurous gases promoted to a corresponding extent. Additional heat may be supplied to the evaporating pan in any desired way as for instance by steam coils or pipes, such as a suitable perforated steam spray pipe 36, to which steam may be admitted in the desired quantities by the valve 37 governing the steam supply. The sulfurous gases driven off from the liquor in the pan 35 are of course rich in sulfur dioxid and may be advantageously used in connection with the weaker gases from the burning pyrites in securing the desired action on the alkali in making the bisulfite liquor for paper manufacture, and may also be similarly used in other operations where it is desired to most economically reinforce the weak sulfurous gases obtainable from the burning of pyrites or other low grade sulfur material. In order to further economize heat it is desirable to introduce any suitable preheater as of the "Liebig" type, for example, in the sulfurous liquor circulating system, as by leading the sulfurous liquor from the absorption towers through the pipe 29 into the jacket of the liquor preheater 30, the liquor issuing from the other end of the jacket through a suitable pipe, such as 34, and passing into the heating or evaporating pan 35 from which it may be taken through the pipe 38 and circulating device 39 discharging through the pipe 40 into the head 33 of the preheater. The liquor may then pass through the suitable circulating tubes 37 within the jacket and surrounded by the cool liquor therein so as to transfer a considerable portion of its heat thereto and drive off sulfurous gases therefrom before this liquor from the pan passes out through the pipe 41 connected with the opposite head 32. This liquor may be still further cooled as by passing it through the coil 43 of a suitable water tube or other cooler 42 so that the exhausted sulfurous liquor entering the absorption towers from the pipe 23 may be cooled to the desired extent.

The bisulfite system employed may comprise a series of any desired number of tanks, such as 47, 48, 49, through which the liquor may flow in succession in the production of the bisulfite of lime or other acid liquor which may be delivered into the storage tank 51 for utilization after it is discharged from the pipe 60. The pipe 56 may connect the bisulfite storage tank 51 with the first bisulfite tank 47, a suitable valve such as 57 controlling the flow of liquor therethrough and in the case of a spraying type of bisulfite tank such as diagrammatically illustrated the liquor may be taken by the pipe 52 and after passing through the pump 53 be discharged through the pipe 54 communicating with the storage tank through the branch 58 provided with the regulating valve 59 and also delivered through the spraying distributer 55 so as to be brought to the desired extent into contact with the gases in the tank. A similar circulating pump and connected distributer may of course be arranged in connection with the other bisulfite tanks and the pipe 61 may be used to connect the first tank 47 with the second tank 48 and a similar pipe 62 may allow the lime or bisulfite liquor to pass from the third tank 49. The lime liquor may of course be supplied to the lime tank through the pipe 76 provided with a valve 69 and pass therefrom into the last bisulfite tank of the series through the pipe 63 provided with the valve 64 which regulates the amount of bisulfite liquor treated. The weak sulfurous gases may be passed through a number of the bisulfite tanks in succession in the opposite direction to the flow of liquor therethrough by providing a suitable passage 16 from the gas cooler 14 having a connection 65 with the first bisulfite tank and the amount of gas entering the tank may be governed by a suitable valve, such as 67, in this gas passage. If desired also a similar gas connection 66 may lead to the second bisulfite tank and regulated amounts of the weak sulfurous gas admitted thereto as determined by the position of the valve 68 in this connection. The concentrated sulfurous gases from the preheater may be taken through the passages 44, 45 into the first bisulfite tank in connection if desired with the concentrated gas from the pan 35 which enters the passage 46 connected with the passage 45. In this way the concentrated sulfurous gas which is rich in sulfur dioxid enters the first bisulfite tank 47 reinforcing the amount of weaker sulfurous gases which may be supplied thereto directly from the cooler or other part of the system so that the bisulfite liquor in this first tank which has been acted upon by the weaker gases with formation of sulfites is finally converted into bisulfite by these enriched gases which should have twenty per cent. or so of sulfur dioxid therein. The gases from the first tank 47 may pass through a suitable connecting passage 77 into the tank 48 to which it is desirable for some purposes to supply the larger proportion of the weaker sulfurous gases from the cooler by suitable regulation of the control valve 67, 68. The passage 78 serves to conduct the sulfurous gases from the tank 48 into the tank 49 and a similar passage 79 may discharge them therefrom.

It is of course understood that this invention has been disclosed in this case, which is a divisional application based on the disclosure of my copending application which has since matured into Patent 981,625, granted January 17, 1911, in connection with a number of illustrative forms, proportions, arrangements of parts, and steps, to the details of which disclosure the invention is not of course to be limited, but

What is claimed as new and what is desired to be secured by Letters Patent is set forth in the appended claims.

1. The apparatus for manufacturing bisulfite for paper making or the like comprising a burner for producing weak sulfurous gases, a scrubber having continuous closed water circulation, a gas cooler, means to pass said weak sulfurous gases in succession through said scrubber and cooler, a series of absorption towers and passages to pass a portion of the weak sulfurous gases from said cooler successively through a plurality of said absorption towers, means to substantially eliminate the sulfur dioxid from the exhausted gases from said absorption towers by contact with alkali liquor, a sulfurous liquor system comprising means to continuously circulate aqueous sulfurous liquor through said absorption towers in the opposite direction to the feed of gases therethrough, a heating pan in said sulfurous liquor system and means to heat said pan by the hot weak sulfurous gases, additional means to heat said pan and drive off concentrated sulfurous gases therefrom, a bisulfite system comprising a plurality of tanks having means to bring the bisulfite liquor during its conversion into contact with the gases therein, means to mix the concentrated sulfurous gases driven off from the sulfurous liquor with another portion of such weak sulfurous gases and to allow the mixture to act on the bisulfite liquor in one of said bisulfite tanks adjacent the first of the series, means to feed the sulfurous gases in succession through said bisulfite tanks and means to feed the bisulfite or lime liquor in succession through a number of said bisulfite tanks in the opposite direction to the feed of sulfurous gases therethrough.

2. The apparatus for bisulfite manufacture comprising a burner for producing hot weak sulfurous gases, means to cool said gases, a sulfurous liquor system comprising absorption means through which aqueous sulfurous liquor is circulated, passages to pass a portion of the weak sulfurous gases through said absorption means for absorption by the liquor therein, a heating pan in said sulfurous liquor system and means to supply heat to said pan from the hot weak sulfurous gases to drive off concentrated sulfurous gases from the liquor in said pan, a bisulfite system comprising a plurality of bisulfite tanks having means to bring the bisulfite liquor during the conversion into contact with the gases therein, means to mix the concentrated sulfurous gases from said pan with another portion of such weak sulfurous gases and to allow the mixture to act on the bisulfite liquor in one of said bisulfite tanks adjacent the first of the series to act upon the bisulfite liquor therein after its absorption of weaker gases, means to feed additional weak sulfurous gases from said cooler to one of said bisulfite tanks adjacent the first of the series and means to feed the bisulfite or lime liquor in succession through a number of said bisulfite tanks in the opposite direction to the feed of sulfurous gases therethrough.

3. In apparatus for manufacturing bisulfite, a burner for producing hot weak sulfurous gases, a sulfurous liquor circulation system comprising absorption means, passages to pass a portion of the weak sulfurous gases through said absorption means to absorb sulfur dioxid therefrom in the circulating sulfurous liquor, a heating device in said liquor system to receive heat from the hot sulfurous gases of said burner and drive concentrated sulfurous gases from the contained liquor, a bisulfite system comprising a plurality of bisulfite tanks, means to supply the concentrated sulfurous gases and another portion of such weak sulfurous gases to one of said bisulfite tanks adjacent the head of the series, means to feed weak sulfurous gases from said burner to one of said bisulfite tanks adjacent the head of the series and means to feed bisulfite liquor successively through a number of said bisulfite tanks in the opposite direction to the feed of sulfurous gases therethrough.

4. The apparatus for manufacturing bisulfite comprising a burner for producing weak sulfurous gases, a sulfurous liquor system comprising absorption means, passages to pass a portion of the weak sulfurous gases through said absorption means to absorb sulfur dioxid in the aqueous circulating liquor, a heating device in said liquor system and means to heat the sulfurous liquor therein and drive off therefrom concentrated sulfurous gases, a bisulfite system comprising a plurality of bisulfite tanks, each having means to spray the bisulfite liquor therein, means to supply the concentrated sulfurous gases from said sulfurous liquor system and another portion of such weak sulfurous gases to said series of bisulfite tanks adjacent the head thereof, and to pass such gases in succession through the remainder of said series and means to feed bisulfite liquor through a number of said bisulfite tanks in the opposite direction to the feed of sulfurous gases therethrough.

5. The apparatus for manufacturing bisulfite which comprises a burner for producing weak sulfurous gases, a sulfurous liquor system comprising absorption means, passages to pass a portion of the weak sulfurous gases from said burner through said absorption means to absorb sulfur dioxid therefrom in the circulating aqueous sulfurous liquor, a heating device in said sulfurous liquor system, means to drive off concentrated sulfurous gases from said sulfurous liquor before returning the same to said absorption means, a bisulfite system comprising a circulating stream of bisulfite liquor and means to supply the concentrated sulfurous gases from said sulfurous liquor system and another portion of such weak sulfurous gases to said bisulfite stream to act upon the bisulfite liquor after action of weaker gases thereon.

6. The apparatus for manufacturing bisulfite comprising a burner for producing weak sulfurous gases, a sulfurous liquor system comprising absorption means, passages to pass a portion of the weak sulfurous gases through said absorption means to absorb sulfur dioxid in the circulating aqueous sulfurous liquor, a heating device in said sulfurous liquor system to drive concentrated sulfurous gases from the liquor therein, a bisulfite system comprising means to feed therethrough a stream of bisulfite liquor, means to supply weak sulfurous gases from said burner to said bisulfite stream and means to supply concentrated sulfurous gases from said sulfurous liquor system to said bisulfite stream to mix with another portion of such weak gases and thereupon act on such bisulfite stream after action of weaker gases thereon.

7. The apparatus for manufacturing bisulfite comprising a burner for producing hot weak sulfurous gases, a sulfurous liquor system comprising absorption means, passages to pass a portion of weak sulfurous gases from said burner through said absorption means for absorption in the circulating aqueous sulfurous liquor, an eliminating device in said sulfurous liquor system to drive off concentrated sulfurous gases from the liquor therein, by the action of said hot weak sulfurous gases produced by said burner, a bisulfite system comprising means to feed therethrough a stream of bisulfite liquor, means to supply weak sulfurous gases to such bisulfite stream and means to supply concentrated sulfurous gases from said sulfurous liquor system, mix with another portion of such weak gases and thereupon act on said bisulfite stream.

8. The apparatus for manufacturing bisulfite comprising means for producing weak sulfurous gases, a sulfurous liquor system comprising absorption means, passages to pass a portion of said weak sulfurous gases through said absorption means for absorption by the circulating sulfurous liquor therein, an eliminating device in said sulfurous liquor system to eliminate concentrated sulfurous gases from the liquor therein, a bisulfite system and means to allow a mixture of said weak sulfurous gases and said concentrated sulfurous gases to act on the bisulfite liquor in said bisulfite system to effect the complete production of bisulfite therein.

9. The apparatus for producing and utilizing sulfurous gases comprising means to produce weak sulfurous gases which are incapable by action on the bisulfite liquor of forming a product of the desired strength, a sulfurous liquor system comprising absorption means, means to pass a portion of said weak sulfurous gases through said absorption means for absorption by the sulfurous liquor therein, an eliminating device in said sulfurous liquor system to eliminate concentrated sulfurous gases from the liquor therein, a bisulfite system comprising means to feed therethrough a stream of bisulfite liquor capable of combining with sulfurous gases and means to allow a mixture of such weak sulfurous gases and of such concentrated sulfurous gases from said sulfurous liquor system to act on the bisulfite liquor in said bisulfite system to finally subject said bisulfite liquor to the action of reinforced sulfurous gases to effect its desired conversion.

10. The apparatus for manufacturing bisulfite comprising a burner for producing weak sulfurous gases which are incapable by action on the line or bisulfite liquor of forming bisulfite of the desired strength, means for producing concentrated sulfurous gases, a bisulfite system comprising tanks containing lime or bisulfite liquor, means for bringing weak sulfurous gases into contact with said lime or bisulfite liquor, and means for mixing such weak sulfurous gases and such concentrated sulfurous gases and bringing them into contact with said lime or bisulfite liquor during its conversion to finally subject said bisulfite liquor to reinforced sulfurous gases to effect its desired conversion.

11. The apparatus for manufacturing bisulfite comprising a burner for producing the hot weak sulfurous gases, a sulfurous liquor system comprising absorption means, passages to pass a portion of said weak sulfurous gases through said absorption means for absorption by the continuously circulating sulfurous liquor therein, a heating device in the said sulfurous liquor system receiving heat from the hot sulfurous gases and eliminating concentrated sulfurous gases from the sulfurous liquor therein, a preheater in said sulfurous liquor system heating the stronger sulfurous liquor by the liquor from said heating device and thereby eliminating concentrated sulfurous gases from said stronger liquor, a bisulfite system comprising tanks containing bisulfite liquor, means to mix concentrated sulfurous gases from said sulfurous liquor system with another portion of such weak sulfurous gases and to allow the mixture to act on said bisulfite liquor.

12. The apparatus for manufacturing bisulfite comprising a burner for producing hot weak sulfurous gases and a gas cooler to cool the same, a sulfurous liquor system comprising means to circulate aqueous sulfurous liquor and absorb sulfurous gases from a portion of said weak sulfurous gases from said burner, a heating pan in said sulfurous liquor system and means to heat said pan by the hot weak sulfurous gases from said burner and drive off concentrated sulfurous gases from said aqueous liquor, a liquor preheater in said aqueous sulfurous liquor system to preheat the liquor supplied to said pan by the hot liquor discharged therefrom, a bisulfite system comprising a plurality of tanks having means to bring the bisulfite liquor during its conversion into contact with the gases therein, means to mix the concentrated sulfurous gases driven off from the sulfurous liquor with another portion of such weak sulfurous gases and to allow the mixture to act on the bisulfite liquor in one of said bisulfite tanks adjacent the first of the series to complete therein the production of bisulfite liquor by the action of such reinforced sulfurous gases, means to feed the sulfurous gases in succession through said bisulfite tanks and means to feed the bisulfite or lime liquor in succession through a number of said bisulfite tanks in the opposite direction to the feed of sulfurous gases therethrough.

VIGGO DREWSEN.

Witnesses:
HARRY L. DUNCAN,
JESSIE B. KAY.